(12) United States Patent
Rochel et al.

(10) Patent No.: US 8,381,151 B1
(45) Date of Patent: Feb. 19, 2013

(54) METHOD AND SYSTEM FOR POWER DISTRIBUTION ANALYSIS

(75) Inventors: Steffen Rochel, Burlingame, CA (US); David Overhauser, Cupertino, CA (US); Gregory Steele, San Jose, CA (US); Kung Hsu, Palo Alto, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/009,830

(22) Filed: Jan. 19, 2011

Related U.S. Application Data

(62) Division of application No. 11/354,280, filed on Feb. 13, 2006, now Pat. No. 7,882,464.

(60) Provisional application No. 60/652,919, filed on Feb. 14, 2005.

(51) Int. Cl.
G06F 17/50 (2006.01)

(52) U.S. Cl. ........ 716/109; 716/110; 716/115; 716/119; 716/120; 716/132

(58) Field of Classification Search .......... 716/106–115, 716/119–120, 132–133
See application file for complete search history.

(56) References Cited

U.S. PATENT DOCUMENTS

| | | |
|---|---|---|
| 5,666,288 A | 9/1997 | Jones et al. |
| 5,835,380 A | 11/1998 | Roethig |
| 5,883,814 A | 3/1999 | Luk et al. |
| 5,933,358 A | 8/1999 | Koh et al. |
| 6,033,107 A | 3/2000 | Farina et al. |
| 2002/0022951 A1 | 2/2002 | Heijningen et al. |
| 2002/0040467 A1 | 4/2002 | Dansky et al. |
| 2002/0065643 A1 | 5/2002 | Hirano et al. |
| 2002/0075018 A1 | 6/2002 | Shimazaki et al. |
| 2002/0144217 A1* | 10/2002 | Lin et al. ............... 716/4 |
| 2003/0061571 A1 | 3/2003 | Buffet et al. |
| 2003/0212973 A1 | 11/2003 | Lin et al. |
| 2004/0015803 A1* | 1/2004 | Huang et al. ............ 716/10 |
| 2004/0073881 A1* | 4/2004 | Nassif et al. ............ 716/10 |
| 2004/0078767 A1 | 4/2004 | Burks et al. |
| 2004/0126840 A1 | 7/2004 | Cheng et al. |
| 2004/0150644 A1 | 8/2004 | Kincaid et al. |
| 2004/0199882 A1* | 10/2004 | Cao et al. ............... 716/4 |
| 2004/0210857 A1* | 10/2004 | Srinivasan ............ 716/2 |
| 2005/0028119 A1 | 2/2005 | Frenkil |
| 2005/0108667 A1 | 5/2005 | Iadanza et al. |
| 2005/0177334 A1* | 8/2005 | Hirano et al. ............ 702/117 |
| 2005/0204316 A1 | 9/2005 | Nebel et al. |
| 2006/0048081 A1* | 3/2006 | Kiel et al. ............... 716/4 |
| 2006/0190892 A1* | 8/2006 | Haridass et al. .......... 716/10 |
| 2006/0224439 A1 | 10/2006 | Smith et al. |
| 2006/0242615 A1* | 10/2006 | Mimura et al. .......... 716/15 |
| 2007/0042372 A1 | 2/2007 | Arita |
| 2007/0088530 A1* | 4/2007 | Erignac et al. ........... 703/1 |
| 2007/0214101 A1 | 9/2007 | Wang et al. |
| 2008/0052654 A1* | 2/2008 | Rahmat et al. ........... 716/6 |

(Continued)

OTHER PUBLICATIONS

Lin et al., "Full-chip Vectorless Dynamic Power Integrity Analysis and Verification Against 100uV/100ps-resolution Measurement", Proceedings of the IEEE 2004 on Custom Integrated Circuits Conference, 2004, pp. 509-512.

(Continued)

*Primary Examiner* — Paul Dinh
(74) *Attorney, Agent, or Firm* — Vista IP Law Group, LLP

(57) ABSTRACT

Disclosed are systems and methods for electrical verification of integrated circuits. Methodologies are described for verification of the power and ground distribution systems (PDS) for system-on-a-chip (SoC) and the verification of the interaction of the PDS with the behavior of integrated circuits.

21 Claims, 8 Drawing Sheets

U.S. PATENT DOCUMENTS

2011/0307233 A1* 12/2011 Tseng et al. .................. 703/14

OTHER PUBLICATIONS

Pant et al.: "Vectorless Analysis of Supply Noise Induced Delay Variation", International Conference on Computer Aided Design, ICCAD-2003, 2003, pp. 184-191.

Jiang et al.: "Vector Generation for Power Supply Noise Estimation and Verification of Deep Submicron Designs", IEEE Transactions on Very Large Scale Integration (VLSI) Systems, vol. 9, Issue: 2, 2001, pp. 329-340.

Bai et al.: "Static Timing Analysis Including Power Supply Noise Effect on Propagation Delay in VLSI Circuits", IEEE Transactions on Very Large Scale Integration (VLSI) Systems, vol. 9, Issue: 2, Publication Year: 2001, pp. 329-340.

Bai et al.: "Maximum Power Supply Noise Estimation in VLSI Circuits Using Multimodal Genetic Algorithms", Electronics, Circuits and Systems, 2001. ICECS 2001. The 8th IEEE International Conference on, vol. 3, Publication Year: 2001, pp. 1437-1440.

Jiang et al.: "Estimation of Maximum Power Supply Noise for Deep Sub-micron Designs", 1998 International Symposium on Low Power Electronics and Design, 1998. Proceedings., Publication Year: 1998, pp. 233-238.

Jiang et al.: "Dynamic Timing Analysis Considering Power Supply Noise Effects", Computer Aided Design, 2000. ICCAD-2000. IEEE/ACM International Conference on, Publication Year: 2000, pp. 493-496.

Najm: "A Survey of Power Estimation Techniques in VLSI Circuits", IEEE Transactions on Very Large Scale Integration (VLSI) Systems, vol. 2, Issue: 4, Publication Year: 1994, pp. 446-455.

Sugiyama et al.: "Quick Power Supply Noise Estimation Using Hierachically Derived Transfer Functions", 9th International Conference on Electronics, Circuits and Systems, 2002, vol. 2, Publication Year: 2002, pp. 713-716.

Non-Final Office Action dated Feb. 22, 2010 for U.S. Appl. No. 11/354,280.

Notice of Allowance dated Jun. 10, 2010 for U.S. Appl. No. 11/354,280.

Notice of Allowance dated Sep. 21, 2010 for U.S. Appl. No. 11/354,280.

Non-Final Office Action dated Jan. 26, 2012 for U.S. Appl. No. 13/009,817.

Non-Final Office Action dated Jan. 26, 2012 for U.S. Appl. No. 13/009,826.

Non-Final Office Action dated Feb. 8, 2012 for U.S. Appl. No. 13/009,823.

Final Office Action dated May 16, 2012 for U.S. Appl. No. 13/009,823.

Final Office Action dated May 11, 2012 for U.S. Appl. No. 13/009,826.

Final Office Action dated May 11, 2012 for U.S. Appl. No. 13/009,817.

Notice of Allowance dated Sep. 14, 2012 for U.S. Appl. No. 13/009,817.

Notice of Allowance dated Sep. 18, 2012 for U.S. Appl. No. 13/009,823.

Notice of Allowance dated Oct. 2, 2012 for U.S. Appl. No. 13/009,826.

* cited by examiner

METHOD AND SYSTEM FOR POWER DISTRIBUTION ANALYSIS

CROSS-REFERENCE TO RELATED APPLICATIONS

The instant application constitutes a division of U.S. application Ser. No. 11/354,280, entitled "METHOD AND SYSTEM FOR POWER DISTRIBUTION ANALYSIS" and filed on Feb. 13, 2006, that claims the benefit of U.S. Provisional Application No. 60/652,919 filed Feb. 14, 2005. The entire contents of both applications are hereby expressly incorporated by reference in their entirety.

The instant application constitutes cross-related to U.S. application Ser. No. 13/009,817, filed concurrently with the instant application, titled "METHOD AND SYSTEM FOR POWER DISTRIBUTION ANALYSIS", U.S. application Ser. No. 13/009,823, filed concurrently with the instant application, titled "METHOD AND SYSTEM FOR POWER DISTRIBUTION ANALYSIS", and U.S. application Ser. No. 13/009,826, filed concurrently with the instant application, titled "METHOD AND SYSTEM FOR POWER DISTRIBUTION ANALYSIS". The entire contents of the aforementioned applications are hereby expressly incorporated by reference in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files and records, but otherwise reserves all other copyright rights.

BACKGROUND AND SUMMARY

The present invention relates to power integrity verification for electrical designs. In particular, embodiments of the present invention provide methods, systems, and methodologies to validate electrical characteristics of power distribution systems (PDSs) in electrical (e.g., IC chip) designs. This type of verification can, for example, ensure that each cell and transistor in the design receive sufficient voltage to operate functionally correct.

Some embodiments of the invention provide a methodology, method, and system for multi-level hierarchical, vector-independent dynamic verification of PDS in Systems on Integrated Circuit or Systems-on-a-Chip (hereinafter SoC) with transistor level resolution. Examples of SoC include small electronic devices made out of semiconductor materials which contain various functional components such as memory, digital and analog blocks made out of passive and active electronic devices. Examples of PDS include physical wiring composed of electrical conductive segments providing electrical connection between the pins of a SoC to all active and passive devices on a SoC.

Examples of systems and methods having multi-level hierarchical verification include systems and methods having the ability to validate the PDS for a cell, macro, or block of a SoC, to extract the physical and electrical characteristic of the cell, macro or block, and to generate a model. Such a model is defined as a PDS model. A PDS model can be used for the verification of PDS at the next hierarchy level. The next hierarchy level can be a macro, a block, or the complete SoC. This methodology is called the bottom-up multi-level hierarchical verification.

Other examples for multi-level hierarchical verification include systems and methods having the ability to perform PDS verification at a specific hierarchy level using PDS models and to capture boundary conditions for each component described by a PDS model and used in the hierarchical levels of investigation. The captured boundary conditions can then be used for PDS verification at a lower hierarchical level. This methodology is called the top-down multi-level hierarchical verification.

Dynamic verification of PDS in SoC includes, for example, the capability to calculate the time-dependent voltages and currents for all segments of PDS. Static verification of PDS in SoC includes, for example, the capability to calculate the time-independent (also called average or peak) voltages and currents for all segments of PDS.

Vector-independent dynamic verification of PDS in SoC includes, for example, the capability to calculate the time-dependent power or current consumption of the components of a SoC independent of functional stimuli for the components of a SoC. Transistor level resolution includes, for example, the ability to calculate the time-dependent fluctuations of the voltages at all segments of PDS from the external connections of the SoC (power and ground pins) through all wire segments of PDS to terminals to active and passive semiconductor devices such as transistors and capacitors for all types of components of SoC.

Prior approaches for implementing power distribution analysis all suffer significant functional drawbacks. For example, systems that perform dynamic verification at transistor level require user provided functional stimuli to calculate the time-dependent current consumption. Moreover, systems that perform dynamic verification at transistor or gate level do not allow for multi-level hierarchical PDS verification. Systems that perform dynamic verification at gate level also require either user provided definitions of switching probabilities for each signal net between the components of SoC or user provided functional stimuli for primary inputs of the SoC or the components thereof. Furthermore, vector-independent dynamic verification at gate level does not provide transistor level resolution for PDS verification. In addition, prior approaches also lack the ability to calculate realistic approximation of worst-case time-dependent current consumption for SoC without user specified power constraints. Finally, prior approaches also lack means for sending effective feedback to the users about the electrical characteristic of PDS and decoupling capacitors.

Some embodiments of the present invention overcomes the limitations of prior solutions by enabling dynamic verification at the gate level requiring neither user provided definitions of switching probabilities for each signal net between the components of SoC nor user provided functional stimuli for primary inputs of SoC as well as a statistical approach to determine locally simultaneously switching components and creating worst case voltage fluctuations. Some embodiments of the instant invention are directed to both a dynamic top-down and a dynamic bottom-up multi-level hierarchical PDS verification with transistor level resolution. In addition, some embodiments of the present invention teach a vector-independent dynamic verification at gate level with transistor level resolution for PDS verification and enable the use of static PDS verification techniques to build PDS models for components of SoC and the use of these models for multi-level hierarchical dynamic PDS verification. Furthermore, some embodiments of the instant invention provide a methodology to measure the effectiveness of explicit decoupling capacitors for placement optimization as well as graphical representation. In addition, some embodiments of the present invention teach a methodology to take into account the variation of the electrical circuit behavior due to manufacturing process variations for the vector-independent calculation of current consumption for SoC.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The accompanying drawings are included to provide a further understanding of the invention and, together with the Detailed Description, to serve to explain the principles of the invention.

DETAILED DESCRIPTION

Embodiments of the present invention provide methods, systems, and methodologies to validate electrical characteristics of power distribution systems (PDSs) in an electrical (e.g., IC chip) designs. As noted above, some embodiments of the invention provide a vector-independent methodology, method, and system for multi-level hierarchical, dynamic verification of PDS in Systems on Integrated Circuit (SoC) with transistor level resolution. Some embodiments of the invention contain several components which are described in the following description.

PDS Model

One of the purposed PDS models is to capture the physical as well as electrical characteristics of the PDS to serve, for example, as the basis for multi-level, hierarchical PDS verification. The PDS model captures the information used for PDS verification as well as time-varying, vector-independent gate level current consumption calculation. Both components facilitate multi-level hierarchical PDS verification, both in the bottom-up and the top-down approach. Additionally, this enables embodiments of the invention to measure, report, and optimize the effectiveness of decoupling capacitors as integral part of PDS.

Figure 1:
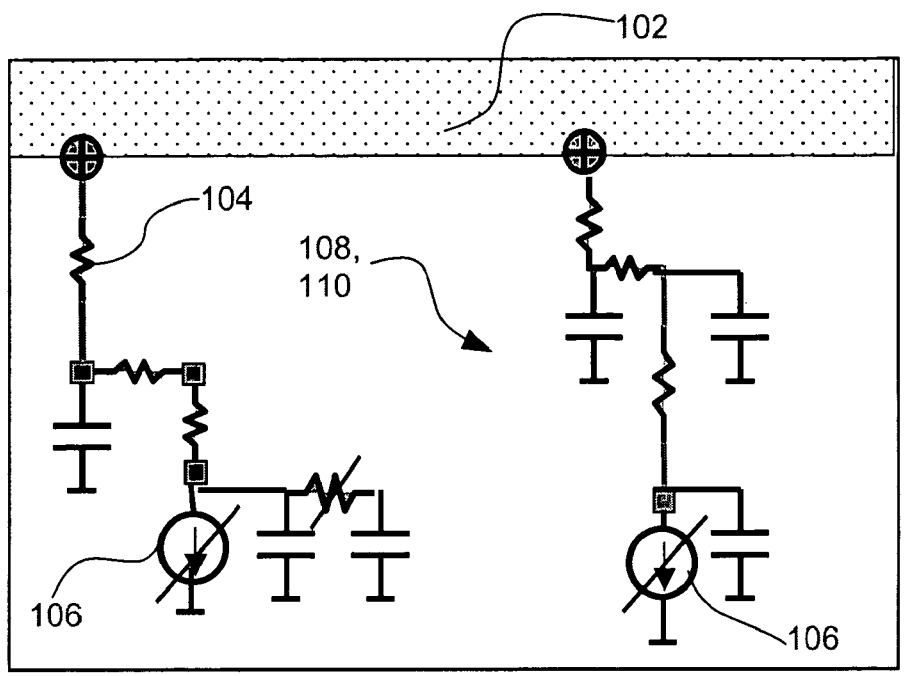
FIG. 1 illustrates an embodiment of a PDS model.

According to one embodiment of the present invention, a PDS model comprises some or all of the following information for a component as shown in FIG. 1 and described below:

Physical information 102 about the segments of PDS used to connect the component within a SoC. These sets of segments are usually referred as ports of a component, and the physical information includes size, location, and layer information. For each segment a terminal point is determined, which further defines the connection of the electrical model for a component.

An electrical network 104 describing the electrical characteristics of the PDS internal to the component. The electrical model can be as simple as a parasitic resistor network and is connected to the terminal points of the PDS model. Moreover, the parasitic network can be described by one or more RLC model or one or more subsets thereof. The electrical model can also be directly extracted from the layout information of the internal PDS. Furthermore, the size of the electrical model can be decreased by applying network reduction techniques.

Location of current sinks 106. Current sinks are in general active or passive electrical devices which are consuming current due to active operation or leakage through the semiconductor devices.

An electrical model 108 for the current sinks within the component. An electrical model can be as simple as a constant or a time-dependent current source. The model can also be described as a function of the supply voltages and the electrical environment of the component. The model can describe the absolute current for each sink or relative current strength between the sinks in a component.

Netlist connectivity information 110. The netlist connectivity information can be at the transistor level or an abstraction thereof. The netlist connectivity information includes as well electrical models describing the electrical behavior of the signal interconnect between components of the netlist. The electrical model can be as simple as a capacitor describing the parasitic signal net capacitor.

Figure 2:
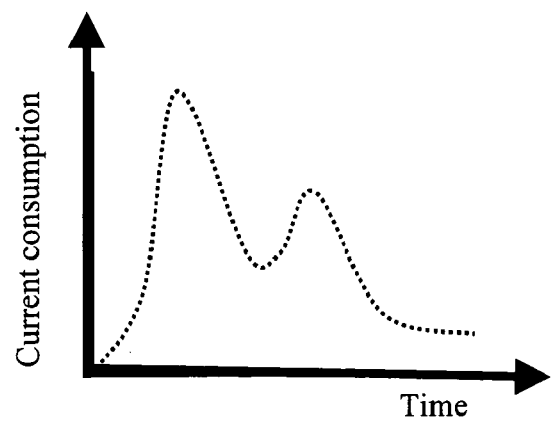
FIG. 2 shows a time-dependent current consumption waveform.

Vector-independent calculation of the time-dependent gate level current consumption The problem being addressed by a vector-independent calculation of the time-dependent gate level current consumption methodology is to calculate the switching situation which causes the worst-case transient IR drop without the need to perform functional verification, i.e., to determine which components are switching simultaneously at which point in time in which direction based on design constraints used for and results of static timing analysis. An example of a vector-independent calculation is a calculation that is performed in a vector-less manner. An example time-dependent gate level current consumption waveform is shown in FIG. 2.

Other proposed approaches are focused solely on the determination of the worst case or peak power consumption and its associated transient current consumption waveform. While the knowledge of the peak power consumption waveform is certainly a good measure, it doesn't necessarily correlate with current consumption waveform causing the worst-cast transient IR drop.

For example, one proposed approach is a methodology to calculate the so called switching scenarios, i.e. to calculate which component is switching at which time and in which direction. The calculation in this approach is based on the timing window calculated by static timing analysis, the transition density under consideration of local logic satisfiability as well as under peak-average ratio constraints. While the proposed methodology can be used to calculate switching situations, the approach does not provide the ability to determine the transient peak power consumption. Therefore a peak-average ratio constraint is introduced as an artificial constraint to mask the deficiency of the proposed methodology. It can be easily shown that the peak-average ratio varies for different SoC as well as between different blocks of a SoC. More importantly, the method does not take into account the impact of locally simultaneously switching components causing large voltage fluctuations.

In other proposed approaches, genetic algorithms are used to calculate worst case vector sets within a given confidence range based on seed sequence(s) in combination with gate level functional simulation algorithms. One drawback of this methodology is that seed sequence needs to be provided by the user of the system, the choice of the seed sequence has strong impact on the convergence behavior of the proposed methodology. Moreover, several, usually resource intensive, functional verification cycles are required until a vector sequence approximating the worst case situation is determined in the defined confidence range. In addition, this approach is only applicable to calculate the worst-case power consumption, and is therefore not applicable to determine the worst-case transient IR drop.

Figure 3:
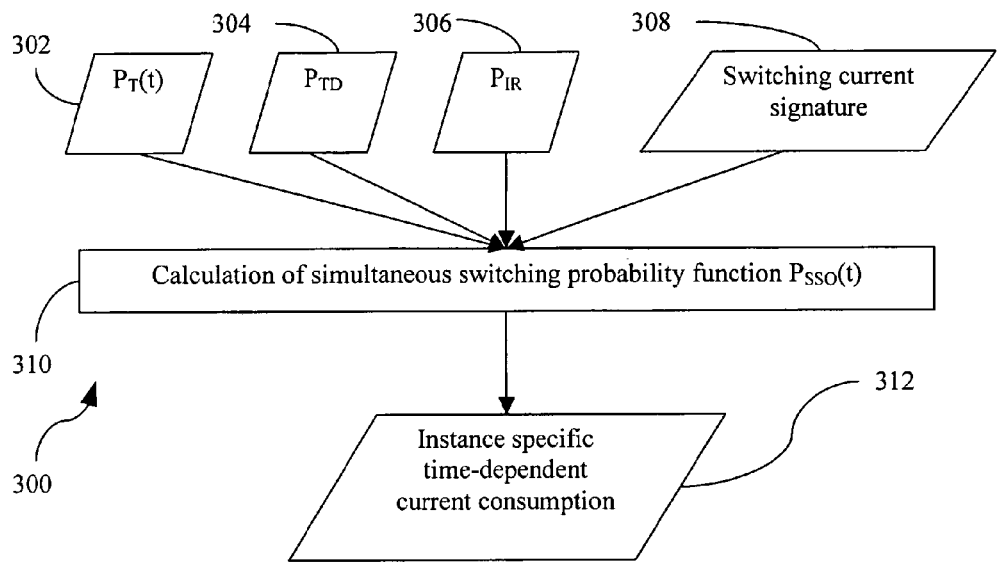
FIG. 3 shows a flow for performing vector-independent calculation of time-dependent instance based current consumption data flow according to some embodiments of the invention.

Some embodiments of the present invention include a methodology that provides the ability to calculate realistic time-dependent current consumption to approximate the worst-case impact on the power distribution system. As shown in the flowchart of FIG. 3, the time and direction of the switching of each individual component 300 is calculated based on a time-dependent simultaneous switching probability function $P_{SSO}(t)$ 310. The time-dependent simultaneous switching probability function $P_{SSO}(t)$ 310 is calculated based on the switching current signature 308, the timing probability $P_T(t)$ 302, the normalized transition density $P_{TD}$ 304, normalized IR probability $P_{IR}$ 306, which are described in further details in the subsequent paragraphs.

One component of the time-dependent simultaneous switching probability function is the timing probability $P_T(t)$ 302, e.g. the probability that a specific instance will switch in a certain direction at specific point in time. One approach is to define the timing probability 302 as a uniform distribution function with $P_T(t)=1$ within the timing window and $P_T(t)=0$ outside. However, discrete switching time points are calculated during static timing analysis, and this information can be used to model the timing probability function 302 more realistically. In addition, statistical static timing analysis will enable the consideration of switching time variations due to process variations. The concept of timing probabilities $P_T(t)$ 302 used in this invention is the basis to take the process variations into account for the vector-independent calculation of the current consumption 300.

Another component of the time-dependent simultaneous switching probability function is the normalized transition density $P_{TD}$ 304, which can be calculated based on the actual transition density for a given signal net, derived either from functional simulation or through probabilistic propagation or a combination thereof, as described in "Full-chip vector-less dynamic power integrity analysis and verification against 100 uV/100 ps-resolution measurement", Custom Integrated Circuits Conference, 2004. Proceedings of the IEEE 2004, 3-6 Oct. 2004, which is hereby incorporated by reference in its entirety.

Another component of the time-dependent simultaneous switching probability function is the normalized IR probability $P_{IR}$ 306, i.e., sensitivity of voltage fluctuation versus load current changes based on the resistive network representing DC characteristic of the PDS. The sensitivity of voltage fluctuations may include statistical variation of the DC characteristic caused by the process variation, and each parasitic resistive element is described by a mean value and distribution function. Therefore, the time-dependent simultaneous switching probability function $P_{SSO}(t)$ 310 can be expressed in the following equation:

$$P_{SSO}(t)=f(P_T(t),P_{TD},P_{IR})) \qquad \text{Equation 1}$$

Stochastic techniques such as the Monte-Carlo method based on the time-dependent simultaneous switching probability $P_{SSO}(t)$ 310 are used together with the switching current waveform for each individual instance to calculate the time dependent current consumption across multiple clock cycles.

Multi-Level Hierarchical Bottom-Up and Top-Down PDS Verification

Figure 4:
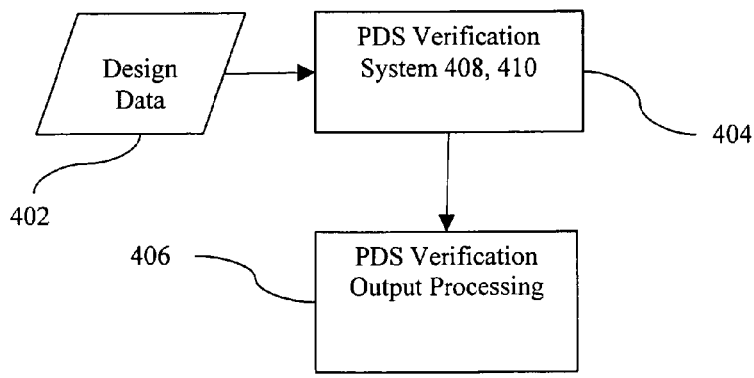
FIG. 4 shows a PDS Verification Flow according to some embodiments of the invention.

FIG. 4 shows the basic PDS verification flow according to an embodiment of the invention. In this flow, the design data 402 provide the input data into the PDS verification system 404 (which comprises transistor level PDS verification system 408 and cell-based PDS verification system 410 described in more detail with respect to FIGS. 5 and 6), followed by processing of generated output data 406.

The PDS verification methodology can be applied to complete or partial design data 402. The design data 402 in one embodiment of the invention include some or all of the following information such as the design layout information, the cell library information, the environment constraints and models, and/or pre-extracted layout parasitic data. Moreover, the cell library information may comprise information such as the timing libraries, the power libraries, the PDS model libraries, the physical abstractions, and/or the transistor level description of cell contents. Finally, the environment constraints and models may comprise information such as the SoC package model data, the design operation constraints, and/or the PDS boundary conditions.

Figure 5:
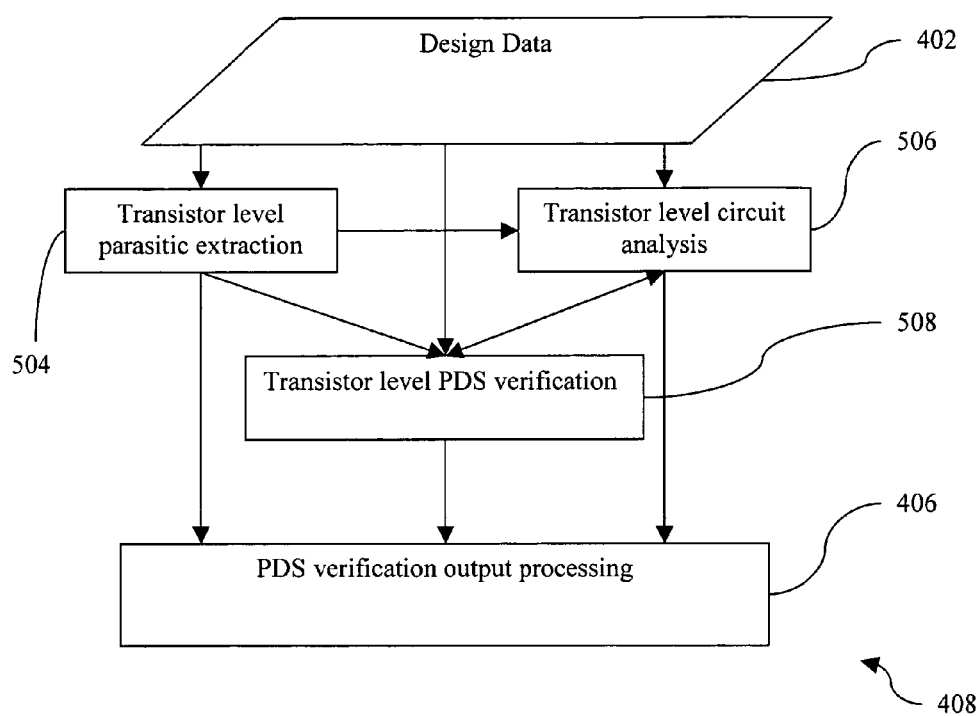
FIG. 5 describes transistor level PDS verification according to some embodiments of the invention.

The transistor level PDS verification system 408 is described in further details in FIG. 5 and enables PDS verification at the transistor level. The transistor level PDS verification system 408 can be applied to verification and characterization of standard cells, I/O cells, analog, digital, and mixed signal custom design blocks. Furthermore, FIG. 5 shows the complete transistor level PDS verification system 408, and simplifications are possible to reduce the amount of data to be analyzed as well as captured in the PDS models. The cell-based PDS verification system 410 is described in further details in FIG. 6.

Referring to FIG. 5, the transistor level PDS verification system 408 performs the transistor level PDS verification 508 based upon the input of the design data 402. The PDS verification results are further processed in the PDS verification output processing 406. In addition, in some embodiments of the present invention, the transistor level PDS verification system further performs the transistor level parasitic extraction 504 and one or more transistor level circuit analyses 506 to achieve the desired transistor level accuracy.

Figure 6:
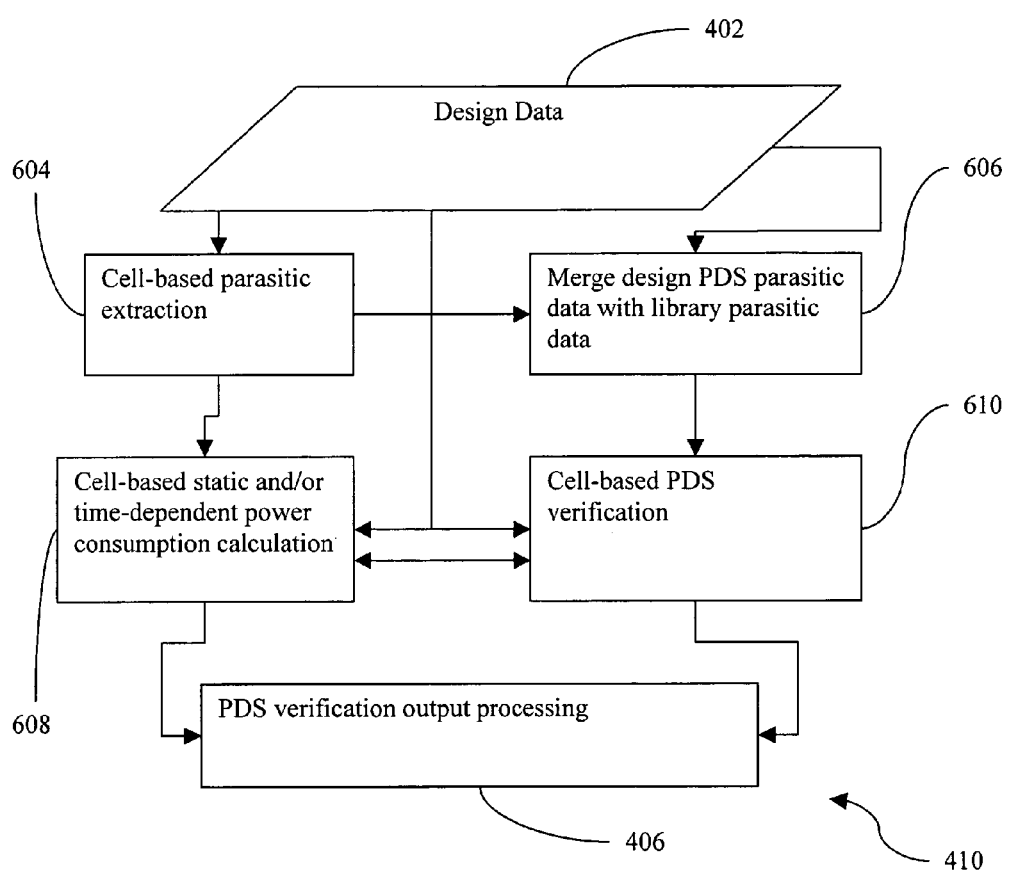
FIG. 6 describes cell-based PDS verification according to some embodiments of the invention.
Figure 7:
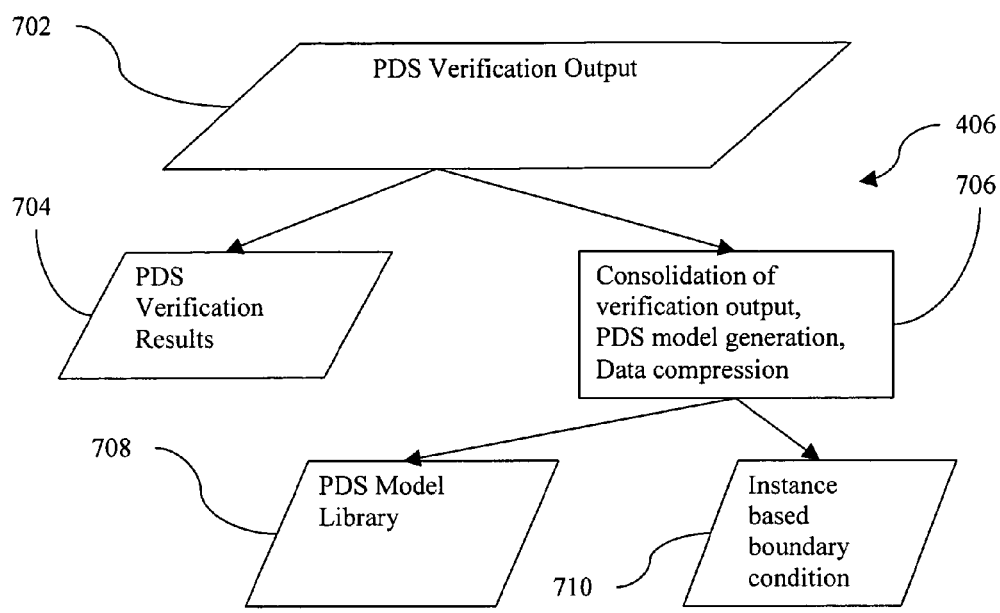
FIG. 7 shows a flow for PDS verification output processing according to some embodiments of the invention.

FIG. 6 shows the cell-based PDS verification system 410 in one embodiment of the invention. In this cell-based PDS verification 410, the design data 402 provide the input data into the cell-based PDS verification system 410. This flow is typically applied to designs and blocks generated by place & route tools. The steps of cell-based parasitic extraction 604 and the cell-based static and/or time-dependent power consumption calculation 608 are performed at the cell level and therefore, this flow can be referred to as cell based PDS verification. Moreover, transistor level accuracy is achieved by merging the contents of PDS models for the cells with the parasitic data 606 generated in step 604 and 608. The results of the cell based PDS verification will be further processed in 406 of the PDS verification flow. The PDS verification output processing 406 contains the PDS model generation of the block or chip verified. FIG. 7 further describe the PDS verification output in more details.

Referring to FIG. 7. The PDS verification output processing phase 406 contains the generation of user consumable data and PDS verification results 704 as well as the consolidation of verification output, data compression, and data processing to build PDS models for the cell or block analyzed 706 with the transistor level PDS verification system 408. The consolidated verification output, the PDS model generated, and compressed data in 706 may be further utilized to merge with the PDS model library 708 or to establish the instance based boundary conditions 710.

The PDS model generated in this step can then be used at the next design hierarchical level to represent a block or partition within a specific design hierarchy level up to the complete SoC. The methodologies of employing the transistor level PDS verification system 408 and the cell-based PDS verification system 410 enable a bottom-up multi-level hierarchical PDS verification.

Top-down PDS verification is enabled with the methodology described herein by capturing PDS boundary conditions 710 for individual design instances. A design instance can be, for example, a partition, a block, a macro, or a cell. The instance based boundary conditions 710 are considered as environment constraints as part of the design data and can be applied at various hierarchical levels. The instance specific PDS boundary conditions 710 enable a methodology to perform PDS verification on a specific design instance taking into account the interaction between different design instances without having to perform PDS verification on the complete SoC. This methodology can be referred to as the top-down PDS verification.

Decoupling Capacitor Effectiveness and Graphical Representation of Decoupling Capacitor Effectiveness Textual and numerical data are used to analyze the results of PDS verification in detail. However, due to the amount of data to be handled during block and full-chip PDS validation, this it is not an efficient way to provide insight about the characteristics of the PDS from a global perspective. Some embodiments of the invention provide a graphical approach to provide feedback about the effectiveness of decoupling capacitors from a global perspective. A global perspective is important in understanding the effectiveness of explicit decoupling capacitors under consideration of parasitic, embedded, and natural decoupling capacitors as well as in allowing the optimization of the placement of explicit decoupling capacitors.

Figure 8:
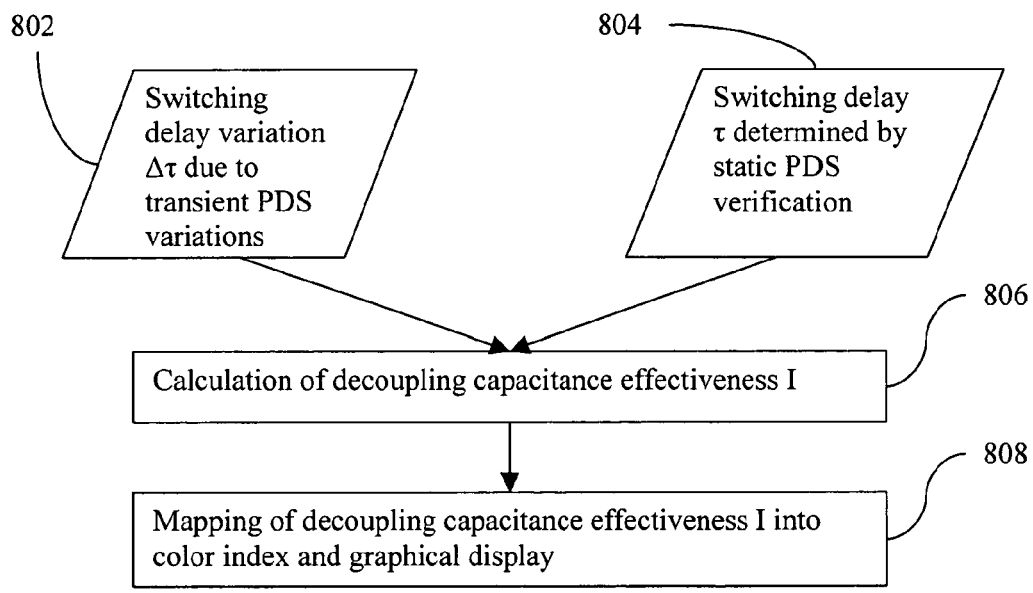
FIG. 8 shows decoupling capacitor effectiveness graphical representation data and process flow according to some embodiments of the invention.

Referring to FIG. 8, one of the purposes of using explicit decoupling capacitors in a PDS is to stabilize the local supply voltages for individual instances in order to minimize device switching delay variations or to avoid functional failures due to the collapse of the supply voltages. The effectiveness of decoupling capacitors 806 can therefore be measured as the ratio of the device switching delay variation $\Delta\tau$ 802 due to transient PDS variations versus the device switching delay $\tau$ 804 at local supply voltages determined by static PDS validation. As the switching delay is a function of the local supply voltages during the switching event, the effectiveness of explicit decoupling capacitors can therefore be approximated as a function of the ratio of the transient supply voltage variation vs. the static supply voltage at the switching cells:

$$I=f(\Delta\tau,\tau) \approx f(\Delta V(t), \Delta V_s)$$  Equation 2

Furthermore, in one embodiment of the present invention, a developed methodology includes the mapping of the effectiveness of explicit decoupling capacitor, I, into a color index 808 as shown in FIG. 8. The color index for each cell may compose, for example, a thermal map, which provides an efficient way to represent the effectiveness of decoupling capacitors globally.

Optimization of the Placement of Decoupling Capacitors

In one embodiment of the instant invention, the developed methodology to measure the effectiveness of explicit decoupling capacitors as defined in Equation 2 can be used as well as cost function together with placement optimization techniques during the placement optimization of explicit decoupling capacitors:

$$\Phi'=\Phi+\Sigma I^2$$  Equation 3

Figure 9:
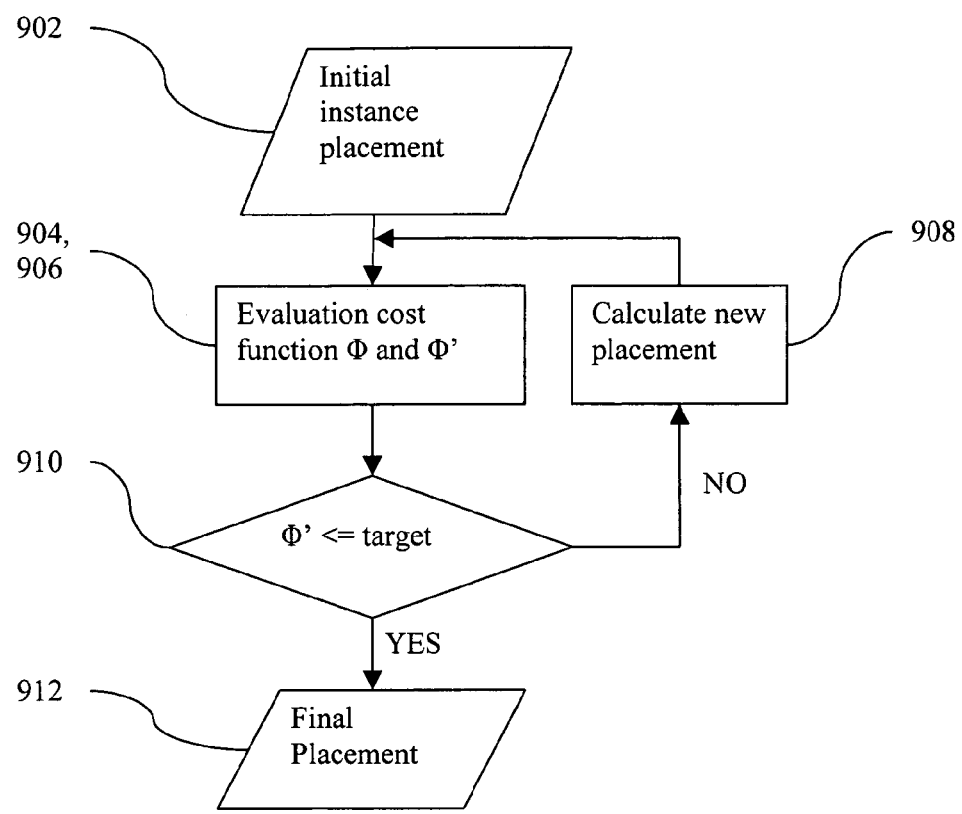
FIG. 9 shows a decoupling capacitor aware placement optimization flow according to some embodiments of the invention.

$\phi$ is the original placement optimization cost function, $\phi'$ is the modified cost function capturing the effectiveness of decoupling capacitors. An embodiment of a decoupling capacitor aware optimization methodology is shown in FIG. 9. The optimization cost function $\phi$ 904 for the initial instance placement 902 is first calculated; then the modified optimization cost function $\phi'$ 906 is evaluated by taking into account the effectiveness of decoupling capacitors. This embodiment of the invention further defines a threshold value for a convergence criterion and determines whether the convergence criterion is met in 910. If the convergence criterion is met the current placement is thus determined to be the final placement 912. If the convergence criterion is not met this embodiment of the invention, calculates new placement and its associated optimization cost function $\phi'$, and repeat the above iterative process until the convergence criterion is met in 910.

System Architecture Overview

Figure 10:
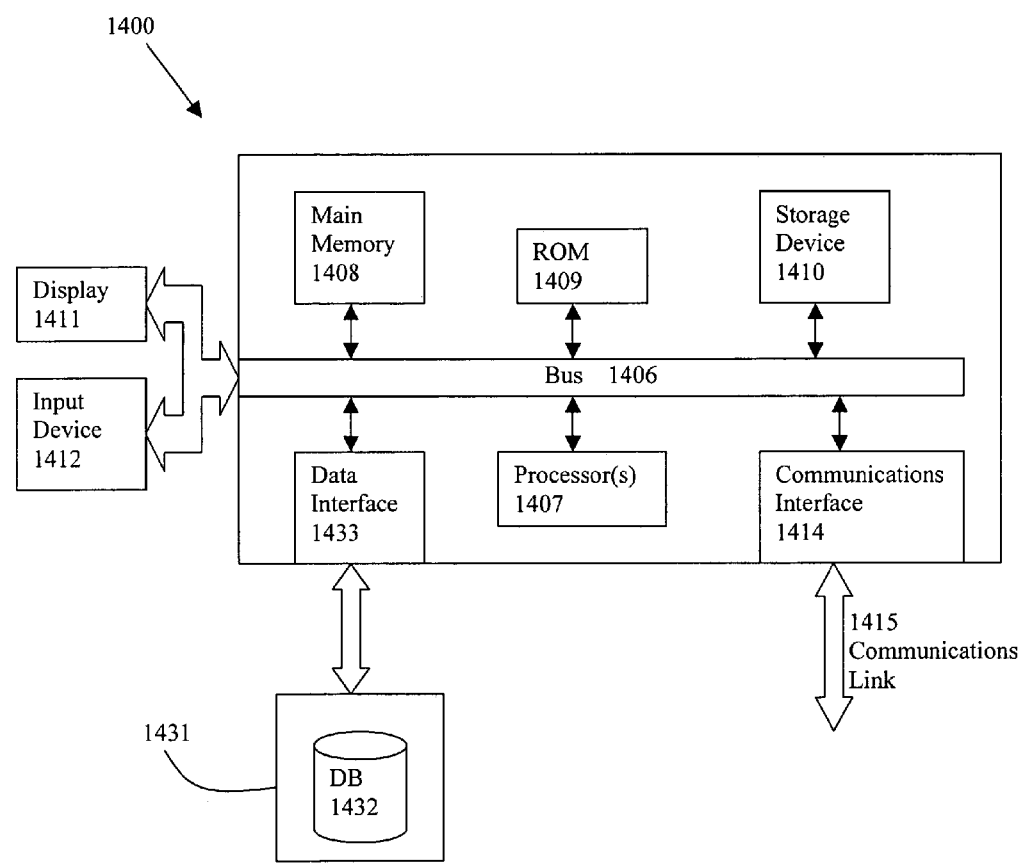
FIG. 10 illustrates an example computing architecture with which the invention may be implemented.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable storage medium" or "computer usable storage medium" as used herein refers to any medium that participates in providing instructions to processor 1407 for execution. Such a medium may take many forms, including but not limited to, non-volatile media, volatile media, and transmission media. Non-volatile media includes, for example, optical or magnetic disks, such as disk drive 1410. Volatile media includes dynamic memory, such as system memory 1408. Transmission media includes coaxial cables, copper wire, and fiber optics, including wires that comprise bus 1406. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for optimizing placement of one or more decoupling capacitors in an electronic design, comprising:
   using at least one processor that is to perform a process, the process comprising:
   placing and routing one or more decoupling capacitors to stabilize one or more local supply voltages for one or more individual instances;
   determining a value of effectiveness, I, of at least one of the one or more decoupling capacitors by using a result of one or more multi-level hierarchical power distribution analyses that provides transistor level resolution for a gate level electronic design comprising a plurality of hierarchical levels, wherein
   the value of effectiveness indicates how well at least one of the one or more decoupling capacitors, which is an explicit decoupling capacitor, stabilizes the one or more local supply voltages for the one or more individual instances;
   identifying or determining a first optimization cost function, $\Phi$, representing a first placement and routing of the one or more decoupling capacitors;
   identifying or determining a second optimization cost function, $\Phi'$, capturing the effectiveness of the at least one of the one or more decoupling capacitors by using at least the first optimization cost function; and
   defining a target threshold of a convergence criterion, below which a final placement and routing of the one or more decoupling capacitors is determined, by using at least the second optimization cost function.

2. The computer implemented method of claim 1, in which the second optimization cost function is determined from the equations:

$$\Phi' = \Phi + \delta; \text{ and}$$

$$\delta = \Sigma I^2, \text{ where}$$

$\Phi$ denotes the first optimization cost function, $\Phi'$ denotes the second optimization cost function, and $I^2$ denotes the square of the value of the effectiveness.

3. The computer implemented method of claim 1, the action of identifying or determining the first optimization cost function comprising:
   evaluating the first placement cost function for a first instance placement.

4. The computer implemented method of claim 1, the action of identifying or determining the second optimization cost function further comprising:
   calculating the second placement cost function based at least in part upon the first placement cost function and the value of the effectiveness of the one or more decoupling capacitors.

5. The computer implemented method of claim 4, the process further comprising:
   determining whether the first instance placement constitutes the final placement based at least in part upon the target threshold.

6. The computer implemented method of claim 1, in which the action for further placing and routing one or more decoupling capacitors is performed by using one or more placement optimization techniques.

7. The computer implemented method of claim 3, the process further comprising:
   determining a different instance placement, in which the different instance placement is different from the first instance placement.

8. The computer implemented method of claim 7, the process further comprising:
   determining a different placement cost function that is associated with the different placement.

9. The computer implemented method of claim 8, the process further comprising:
   evaluating the different placement cost function for the different instance placement; and
   determining whether the different instance placement constitutes the final placement based at least in part upon the target threshold.

10. An article of manufacture including a non-transitory computer usable storage medium having stored thereupon a sequence of instructions which, when executed by at least one processor, causes the at least one processor to execute a method for optimizing placement of one or more decoupling capacitors in an electronic design, the method comprising:
    using the at least one processor to perform a process, the process comprising:
    placing and routing one or more decoupling capacitors to stabilize one or more local supply voltages for each of one or more individual instances;

determining a value of effectiveness, I, of at least one of the one or more decoupling capacitors by using a result of one or more multi-level hierarchical power distribution analyses that provides transistor level resolution for a gate level electronic design comprising a plurality of hierarchical levels, wherein the value of effectiveness indicates how well at least one of the one or more decoupling capacitors, which is an explicit decoupling capacitor, stabilizes the one or more local supply voltages for the one or more individual instances;

defining and calculating a first optimization cost function, $\Phi$, representing an original placement and routing of the one or more decoupling capacitors;

defining and calculating a second optimization cost function, $\Phi'$, capturing the effectiveness of at least one of the one or more decoupling capacitors by using at least the first optimization cost function; and defining a target threshold of a convergence criterion, $\delta$ below which a final placement and routing of the one or more decoupling capacitors is determined, by using at least the second optimization cost function.

11. The article of manufacture of claim 10, the action of identifying or determining the first optimization cost function comprising:

evaluating the first placement cost function for a first instance placement.

12. The article of manufacture of claim 10, the action of identifying or determining the second optimization cost function further comprising:

calculating the second placement cost function based at least in part upon the first placement cost function and the value of the effectiveness of the one or more decoupling capacitors.

13. The article of manufacture of claim 12, the process further comprising:

determining whether the first instance placement constitutes the final placement based at least in part upon the target threshold.

14. The computer implemented method of claim 11, the process further comprising:

determining a different instance placement, in which the different instance placement is different from the first instance placement; and determining a different placement cost function that is associated with the different placement.

15. The article of manufacture of claim 14, the process further comprising:

evaluating the different placement cost function for the different instance placement; and determining whether the different instance placement constitutes the final placement based at least in part upon the target threshold.

16. A system for optimizing placement of one or more decoupling capacitors in an electronic design, comprising:

at least one processor that is to:

place and route one or more decoupling capacitors to stabilize one or more local supply voltages for each of one or more individual instances;

determine a value of effectiveness, I, of at least one of the one or more decoupling capacitors by using a result of one or more multi-level hierarchical power distribution analyses that provides transistor level resolution for a gate level electronic design comprising a plurality of hierarchical levels, wherein the value of effectiveness indicates how well at least one of the one or more decoupling capacitors, which is an explicit decoupling capacitor, stabilizes the one or more local supply voltages for the one or more individual instances;

define and calculate a first optimization cost function, $\Phi$, representing an original placement and routing of the one or more decoupling capacitors;

define and calculate a second optimization cost function, $\Phi'$, capturing the effectiveness of the at least one of the one or more decoupling capacitors by using at least the first optimization cost function; and define a target threshold of a convergence criterion, $\delta$ below which a final placement and routing of the one or more decoupling capacitors is determined, by using at least the second optimization cost function.

17. The system of claim 16, the at least one processor that is to identify or determine the first optimization cost function is further to:

evaluate the first placement cost function for a first instance placement.

18. The system of claim 16, the at least one processor that is to identify or determine the second optimization cost function is further to:

calculate the second placement cost function based at least in part upon the first placement cost function and the value of the effectiveness of the one or more decoupling capacitors.

19. The system of claim 18, the at least one processor further to:

determine whether the first instance placement constitutes the final placement based at least in part upon the target threshold.

20. The system of claim 17, the at least one processor further to:

determine a different instance placement, in which the different instance placement is different from the first instance placement; and determine a different placement cost function that is associated with the different placement.

21. The system of claim 20, the at least one processor further to:

evaluate the different placement cost function for the different instance placement; and determine whether the different instance placement constitutes the final placement based at least in part upon the target threshold.

* * * * *